(12) United States Patent
Yamaguchi

(10) Patent No.: US 7,498,698 B2
(45) Date of Patent: Mar. 3, 2009

(54) SUPERCONDUCTING POWER TRANSMISSION CABLE AND POWER TRANSMISSION SYSTEM

(75) Inventor: Sataro Yamaguchi, Kasugai (JP)

(73) Assignee: Kabushiki Kaisha Y.Y.L., Tokyo (JP)

( * ) Notice: Subject to any disclaimer, the term of this patent is extended or adjusted under 35 U.S.C. 154(b) by 774 days.

(21) Appl. No.: 11/177,364

(22) Filed: Jul. 11, 2005

(65) Prior Publication Data

US 2006/0211579 A1 Sep. 21, 2006

(30) Foreign Application Priority Data

Jan. 31, 2005 (JP) ............................. 2005-023814

(51) Int. Cl.
*H01B 7/00* (2006.01)

(52) U.S. Cl. .................. 307/147; 174/125.1; 174/15.5; 505/230; 505/886

(58) Field of Classification Search .............. 174/125.1, 174/15, 5; 505/230, 886; 307/147
See application file for complete search history.

(56) References Cited

U.S. PATENT DOCUMENTS 4,184,042 A * 1/1980 Vulis et al. .................. 174/15.5
6,112,531 A 9/2000 Yamaguchi
6,255,595 B1 * 7/2001 Metra et al. ............... 174/125.1
6,262,375 B1 * 7/2001 Engelhardt et al. ........ 174/125.1
6,576,843 B1 * 6/2003 Ashworth ................. 174/125.1

FOREIGN PATENT DOCUMENTS

| JP | 10-112407 A | 4/1998 |
|---|---|---|
| JP | 2003-217735 A | 7/2003 |
| JP | 2003-333746 A | 11/2003 |

* cited by examiner

*Primary Examiner*—Albert W Paladini
(74) *Attorney, Agent, or Firm*—Sughrue Mion, PLLC

(57) ABSTRACT

A superconducting cable having improved transmission efficiency facilitates the laying operation and reduces heat intrusion. The superconducting cable comprises a first pipe 105 within which are accommodated a refrigerant passage section 101, a superconducting member 102 and an electrical insulating section 103, and a second pipe 106 arranged on the outer side of the first pipe. A vacuum heat insulating section 104 is provided between the first and second pipes. The second pipe is formed of a ferromagnetic material.

34 Claims, 16 Drawing Sheets

FIG.2 Magnetic properties of directional silicon steel sheet (cited from HP of JFE steel)

FIG.5
(A)
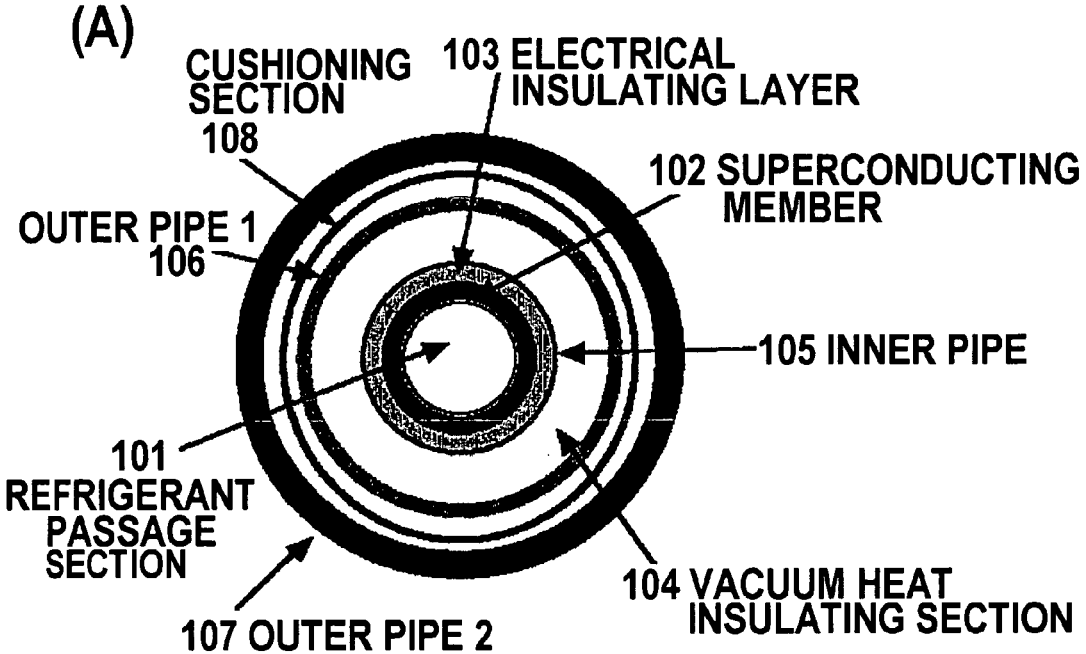
(B)
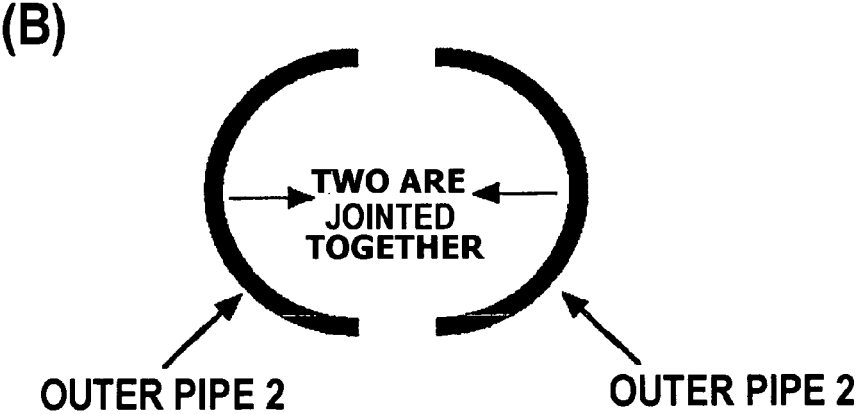

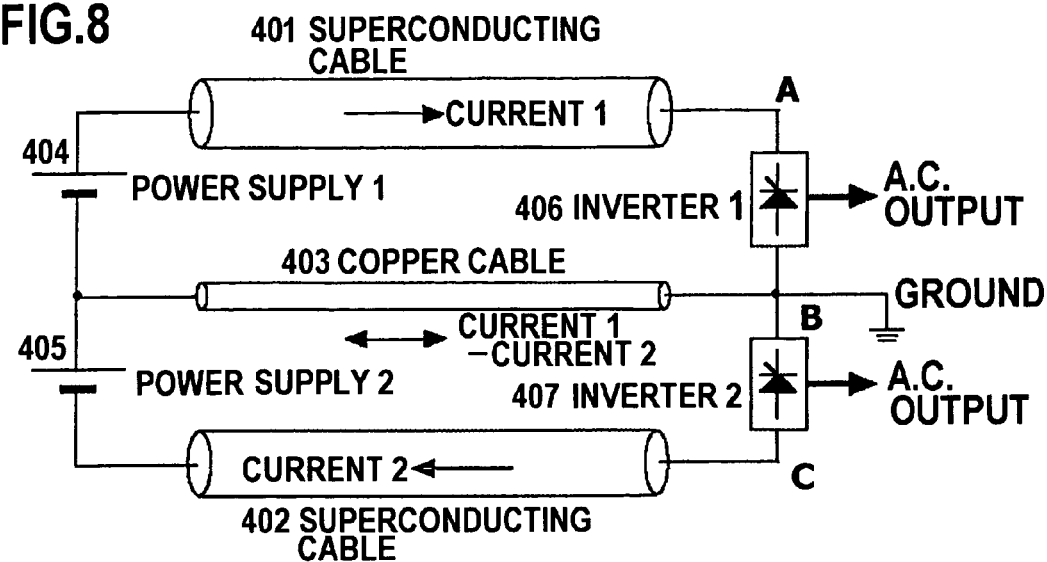
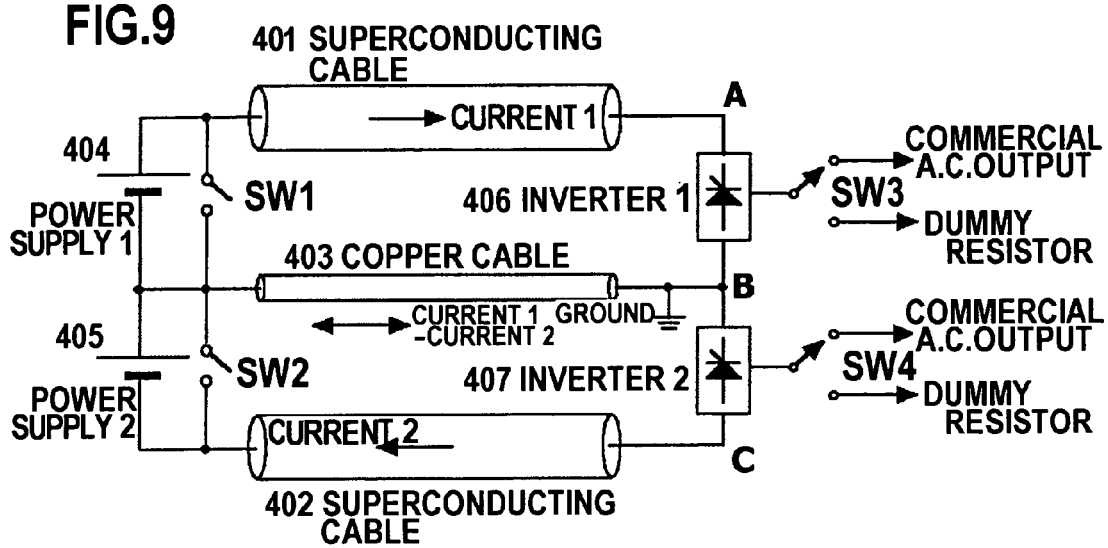

FIG.11
(A) FRONT VIEW
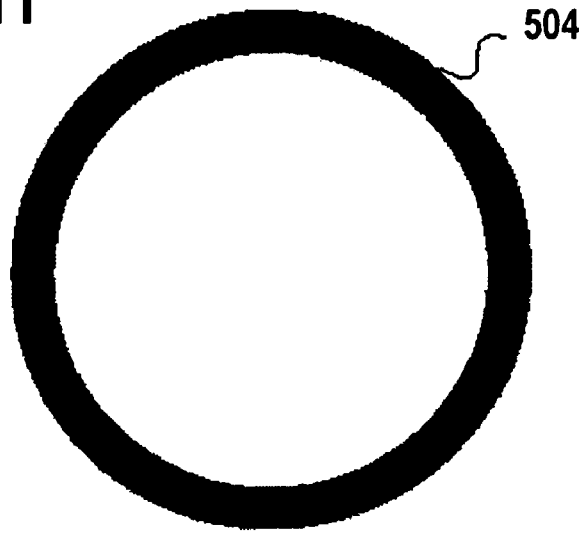
504
(B) SIDE VIEW
(C)
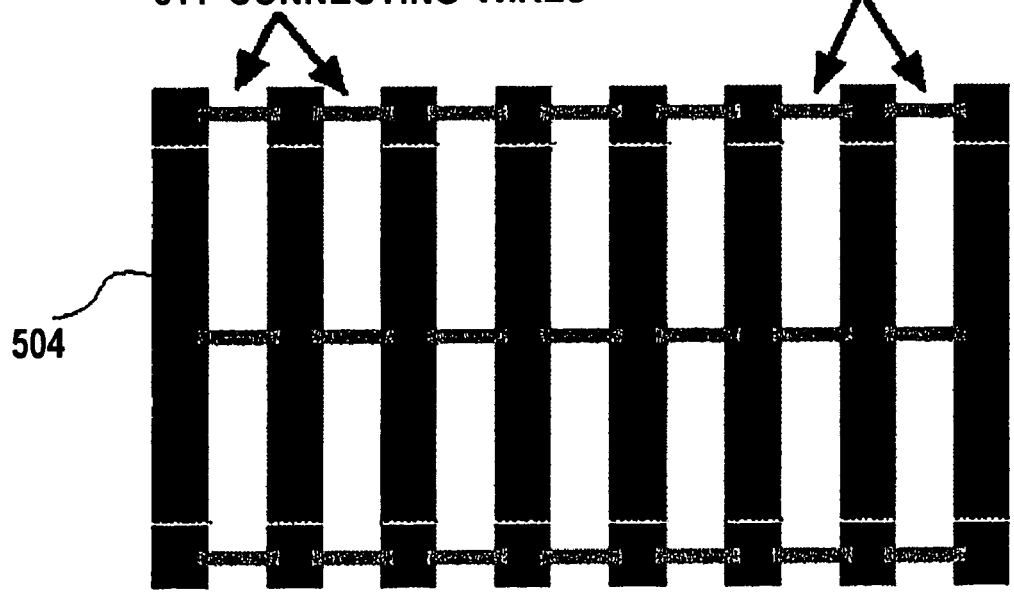
511 CONNECTING WIRES    CONNECTING WIRES
504

SUPERCONDUCTING POWER TRANSMISSION CABLE AND POWER TRANSMISSION SYSTEM

FIELD OF THE INVENTION

This invention relates to a superconducting power transmission cable and a power transmission employing such cable.

BACKGROUND OF THE INVENTION

As a superconducting power transmission cable, a large variety of different structures have so far been proposed. There is presently raised a demand for facilitating the laying operation and improving the measures to be taken against heat intrusion. Regarding the superconducting cable, reference is made to the following Patent Publications 1 and 2 and, regarding a current terminal provided with a thermoelectric transducer, reference is made to the following Patent Publication 3.

[Patent Document 1] JP Patent Kokai 2003-333746A
[Patent Document 2] JP Patent Kokai H10-112407A
[Patent Document 3] JP Patent Kokai 2003-217735A

SUMMARY OF THE DISCLOSURE

It is therefore a principal object of the present invention to provide a superconducting cable, and a d.c. power transmission system wherein it is possible to improve the transmission efficiency as well as to facilitate the laying operation and to reduce the heat intrusion.

According to a first aspect of the present invention, there is provided with a novel superconducting power transmission cable constructed substantially as follows.

The superconducting power transmission cable at least comprises a first pipe having a superconducting member accommodated therein, and a second pipe arranged on an outer side of the first pipe, wherein a vacuum heat insulating section is provided between the first and second pipes, and the second pipe is formed of a ferromagnetic material.

According to the present invention, the first pipe may have accommodated therein a refrigerant passage section, the superconducting member and an electrically insulating section, in this order, when looking from an inner side.

According to the present invention, the second pipe may be an iron pipe.

According to the present invention, the second pipe may include a magnetic gap along the longitudinal direction thereof.

According to the present invention, the second pipe may include a non-magnetic material in the magnetic gap.

According to the present invention, an insulating member composed of a plurality of sheets may be provided in the vacuum heat insulating section provided between the first and second pipes, in which the sheets each may have at least an aluminum layer deposited thereon.

According to the present invention, the superconducting member may be composed of a former and a superconducting material (e.g., tape) wound thereon.

According to the present invention, the second pipe may at least include one pipe accommodated therein via a vacuum heat insulating section, and another pipe having the one pipe accommodated therein.

According to the present invention, the one pipe may be used for keeping vacuum tightness and the other pipe may be used for keeping magnetic energy.

According to the present invention, facing ends of straight pipe sections of the superconducting power transmission cables may be connected to each other by a bellows tube, and the straight pipe sections of the superconducting power transmission cable may be secured on at least plurality of sites separated from one another.

According to the present invention, the first pipe may have accommodated therein a first refrigerant passage section, a first superconducting member, a first electrically insulating section, a ferromagnetic section, a second superconducting member through which the current flows in a reverse direction to that in the first superconducting member, a second electrically insulating section and a second refrigerant passage section, in this order, when looking from an inner side.

According to the present invention, the ferromagnetic section may be composed of a plurality of rings of a ferromagnetic material arranged along a longitudinal axis of the first pipe. The neighboring ones of the rings of the ferromagnetic material may be interconnected by a connection wire.

According to the present invention, at an ambient temperature end of the superconducting power transmission cable, a superconducting strand, forming the superconducting member, may be connected via a lead to a first feed-through performing the role of vacuum sealing and electrical insulation, and is further connected from the first feed-through via a lead to a second feed-through arranged between the vacuum and the atmospheric side, and a thermoelectric transducer may be connected to the second feed-through to reduce heat intrusion. The thermoelectric transducer may be connected from the second feed-through over a cable to an external power supply.

According to the present invention, the second feed-through may include a first electrode provided on a vacuum side and adapted for carrying the thermoelectric transducer thereon, an electrically insulating first insulating plate, adapted for carrying the first electrode, a second electrode sandwiching the first insulating plate with the first electrode and connected over a cable to a power supply on the ambient temperature atmospheric side, and an electrically insulating second insulating plate, adapted for carrying the second electrode.

According to the present invention, the second feed-through may include a first electrode provided on the vacuum side and connected to one side of the thermoelectric transducer, a third electrode provided on the vacuum side and connected to the other side of the thermoelectric transducer and to a current lead, electrically insulating first and third insulating plates adapted for carrying the first and third electrodes, respectively; a second electrode sandwiching the first insulating plate with the first electrode and connected over a cable to a power supply on the ambient temperature atmospheric side, and an electrically insulating second insulating plate, adapted for carrying the second electrode.

According to the present invention, a ferromagnetic material is used as a material for the second pipe to increase the magnetic energy that may be retained in the space. The transmission efficiency may be improved because the transmission line has the effect of the SMES.

BRIEF DESCRPTION OF THE DRWINGS

Figure 3:
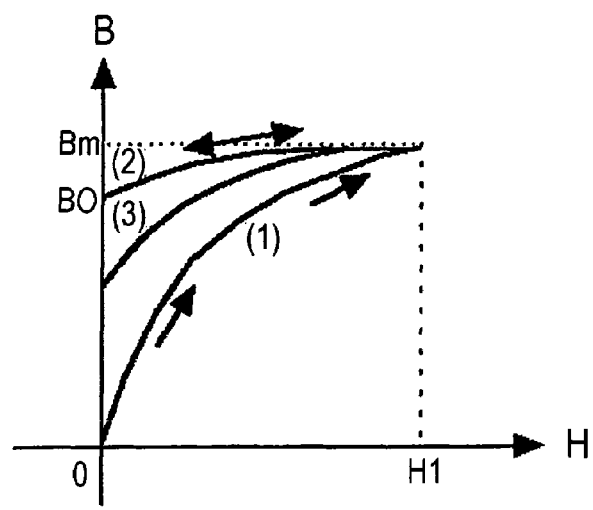

FIG. 3 schematically shows magnetic characteristics of a ferromagnetic material.

FIGS. 4A and 4B show the structures of an outer pipe embodying the present invention.

FIGS. 5A and 5B show the structures of another pipe embodying the present invention.

Figure 6:
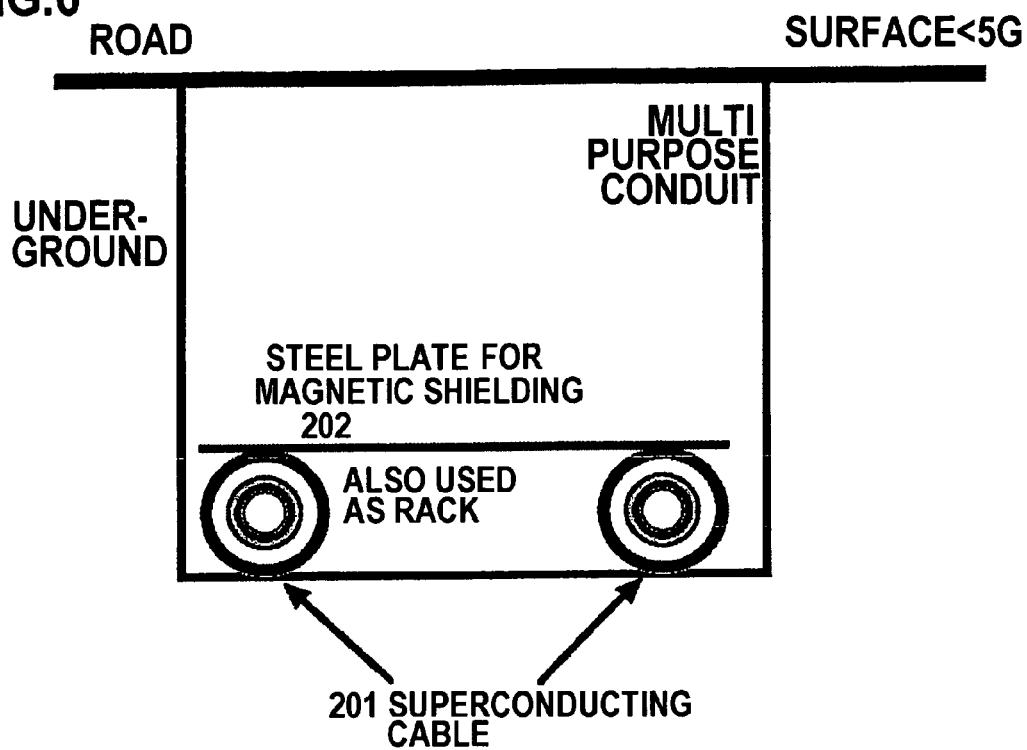

FIG. 6 illustrates an example of installing a cable in e.g. a multi-purpose underground conduit in an embodiment of the present invention.

Figure 7:
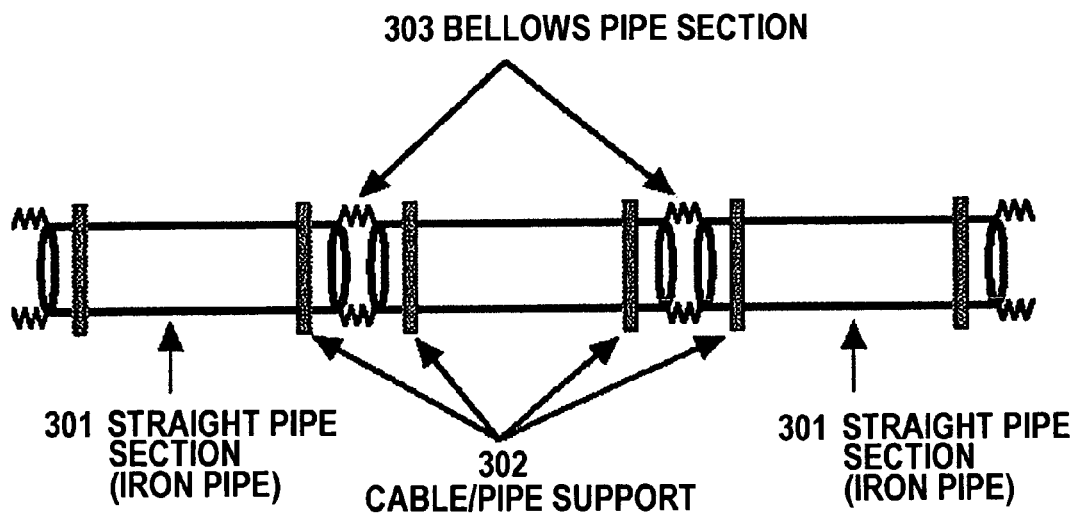

FIG. 7 shows a cable supporting structure in an embodiment of the present invention.

FIG. 8 shows a transmission cable structure by a single core superconducting cable according to an embodiment of the present invention.

FIG. 9 shows a transmission cable structure by a single core superconducting cable according to another embodiment of the present invention.

Figure 10:
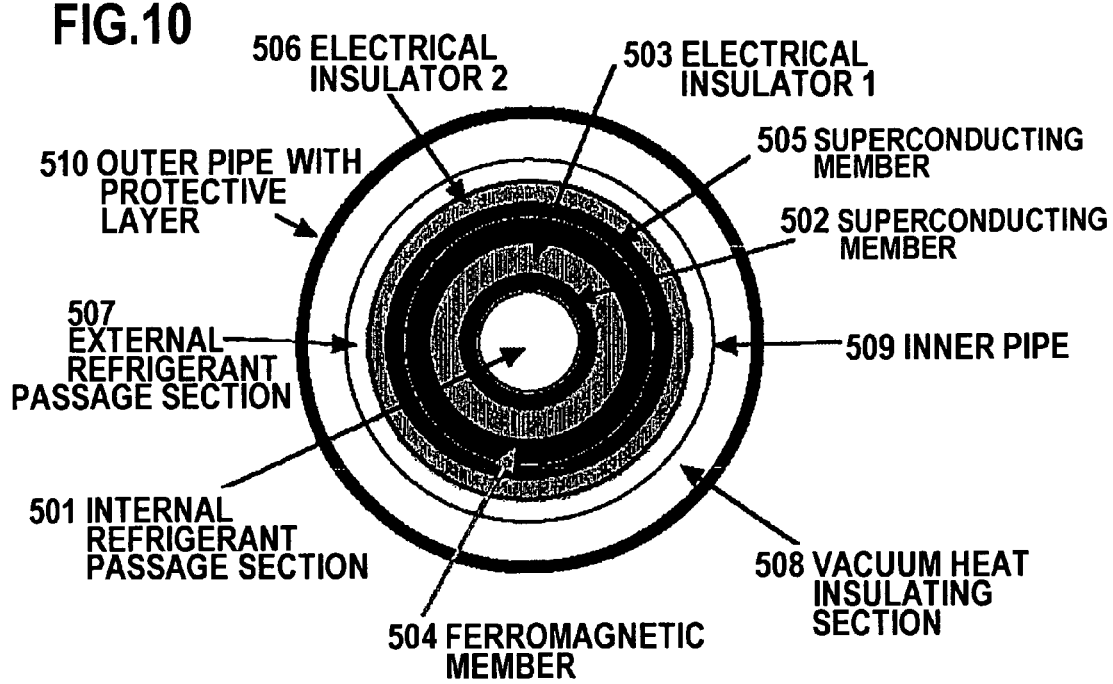

FIG. 10 shows the cross-section of a coaxial cable structure according to another embodiment of the present invention.

FIGS. 11A, 11B and 11C show a front side of a ferromagnetic member for a coaxial cable in another embodiment of the present invention, a lateral side thereof, and a structure for interconnecting plural rings, respectively.

Figure 12:
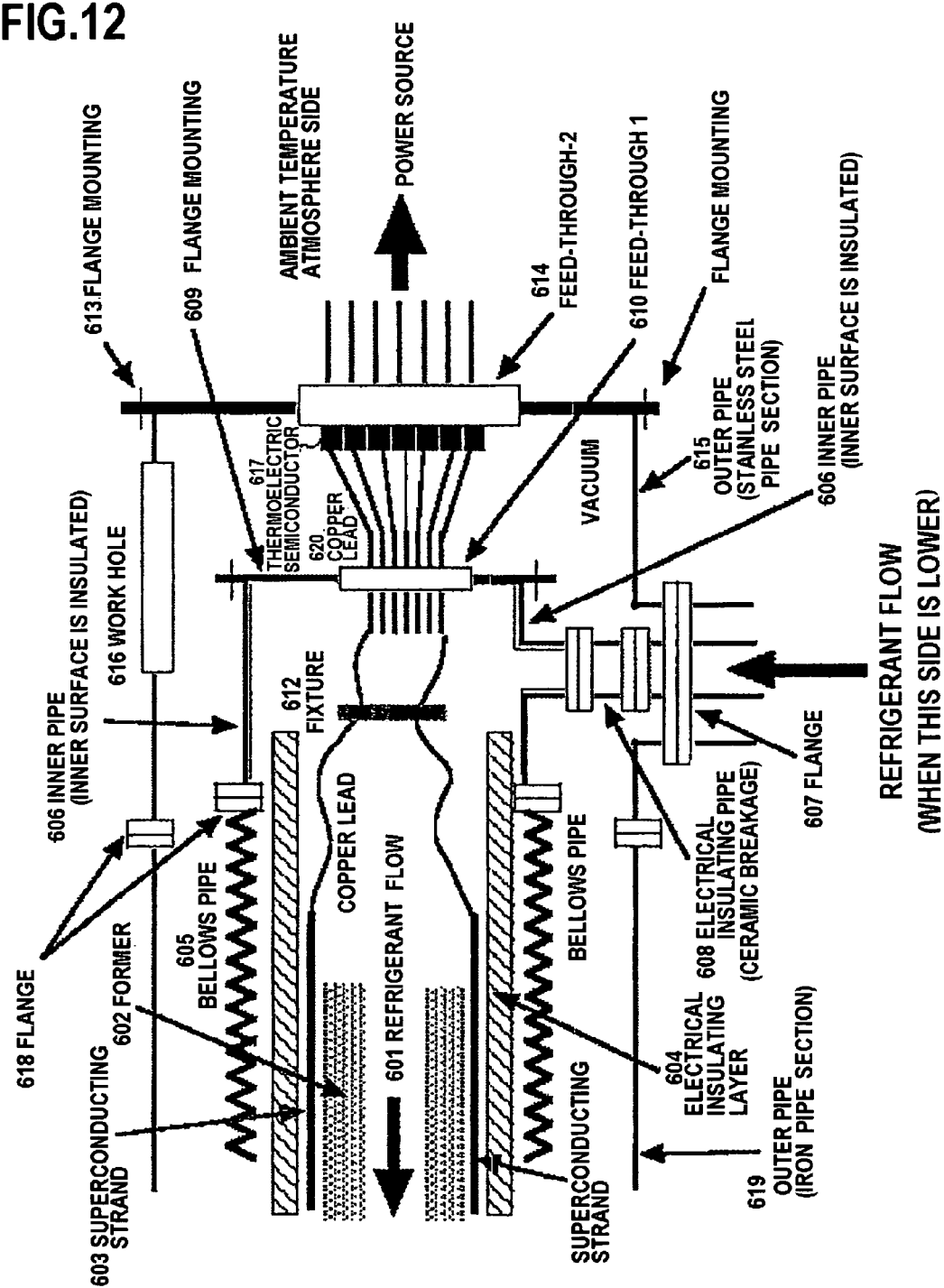

FIG. 12 shows the structure of an ambient temperature end section in an embodiment of the present invention.

Figure 13:
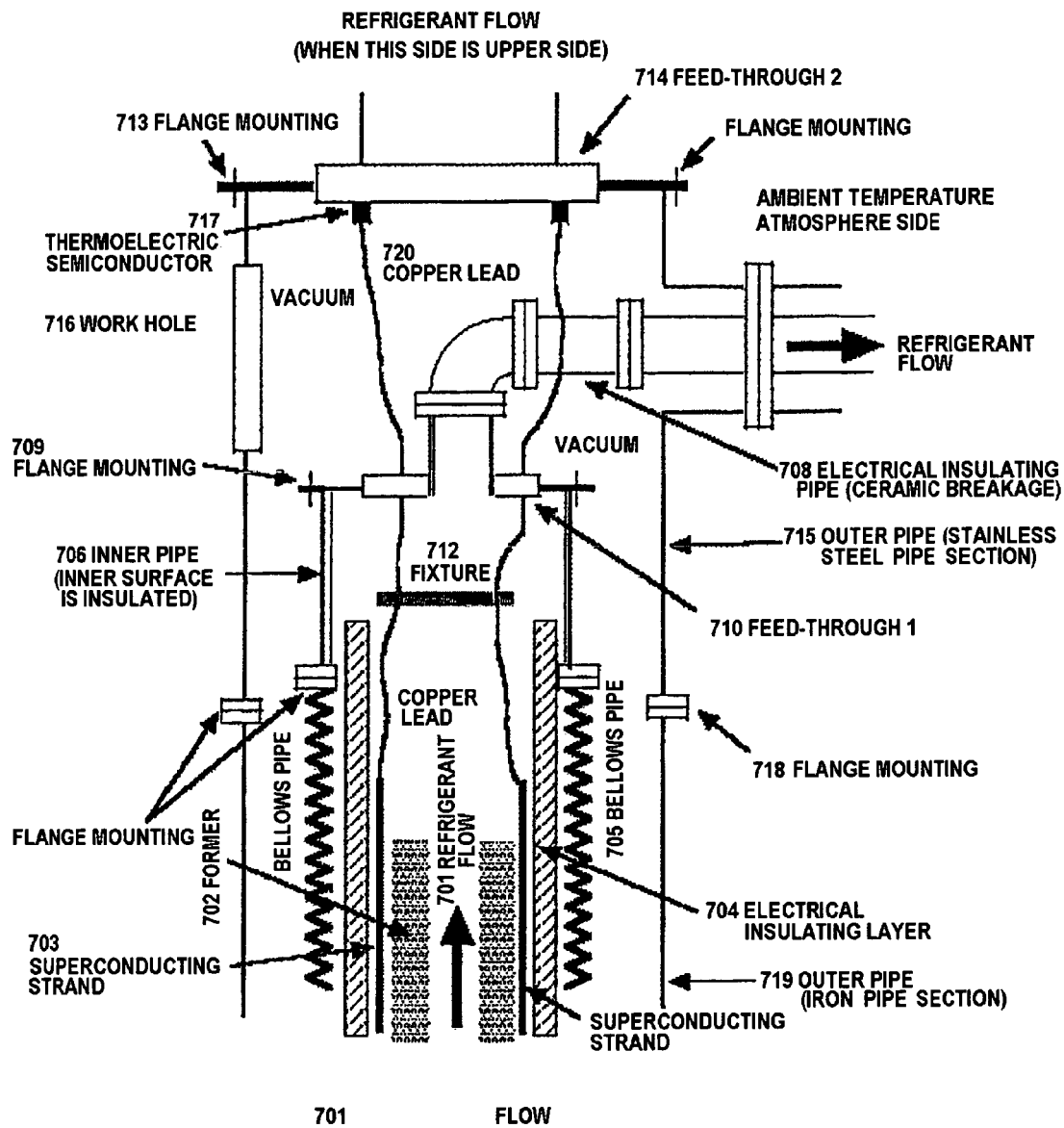

FIG. 13 shows the structure of an ambient temperature end section in another embodiment of the present invention.

Figure 14:
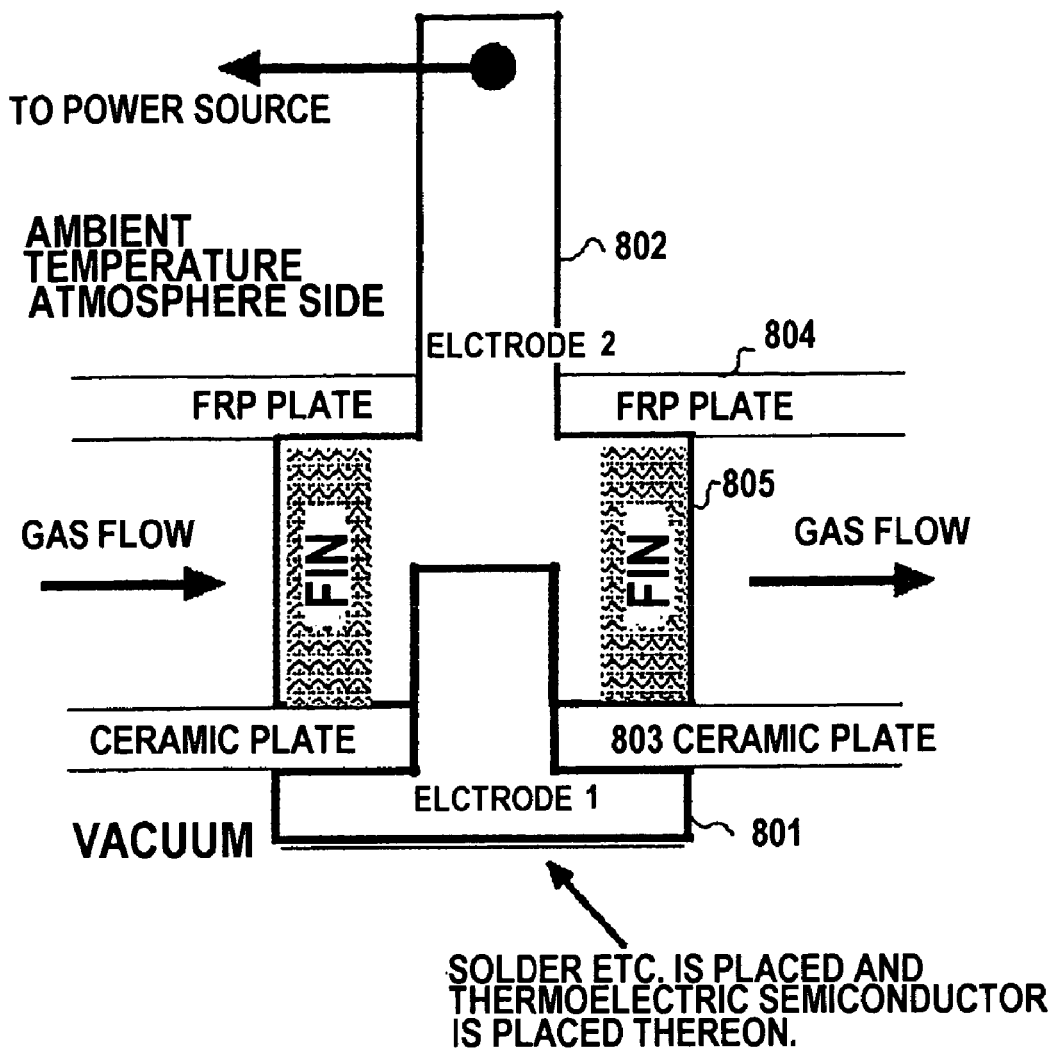

FIG. 14 shows the structure of a feed-through 2 in an embodiment of the present invention.

Figure 15:
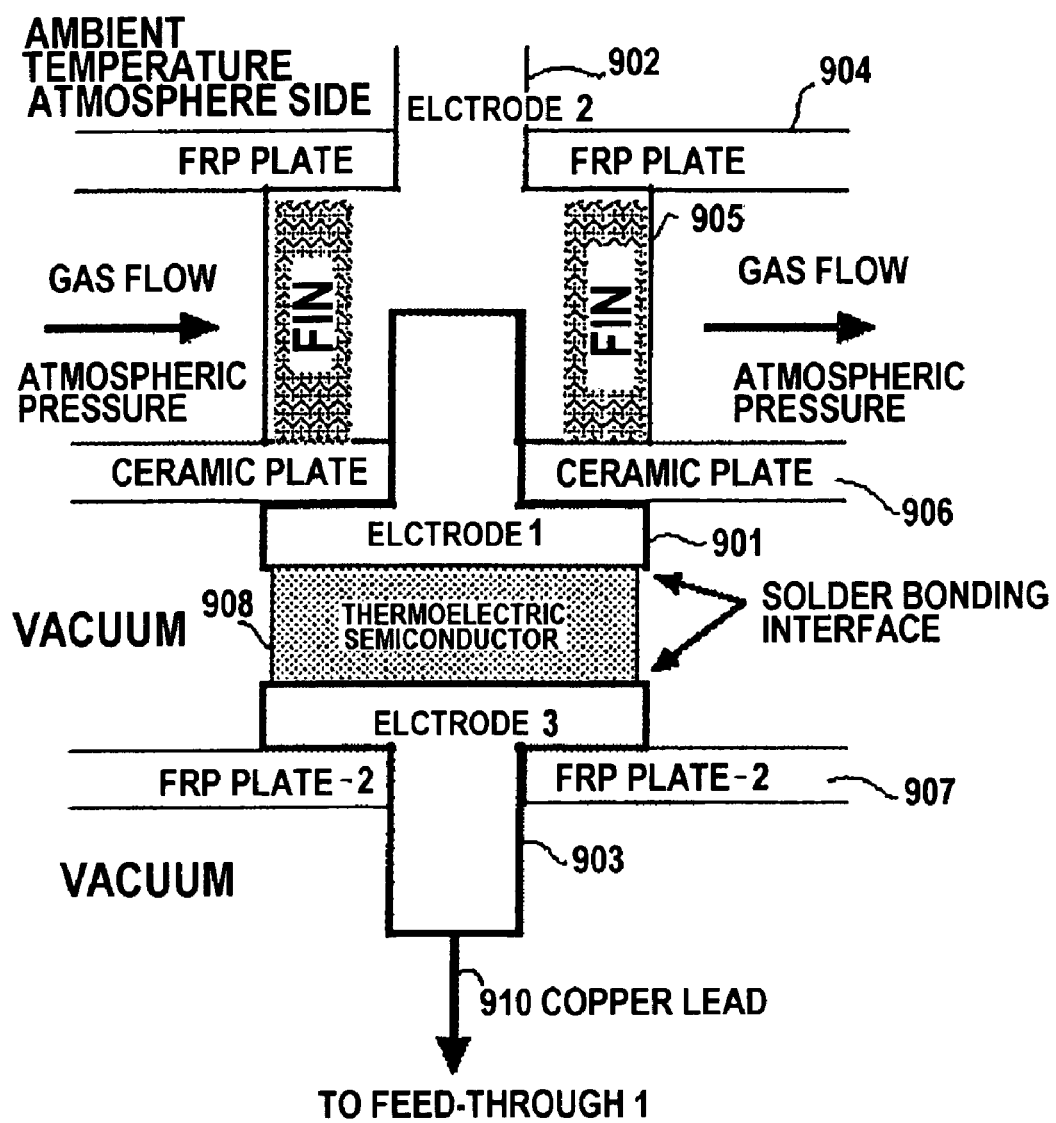

FIG. 15 shows the structure of a feed-through 2 in another embodiment of the present invention.

Figure 16:
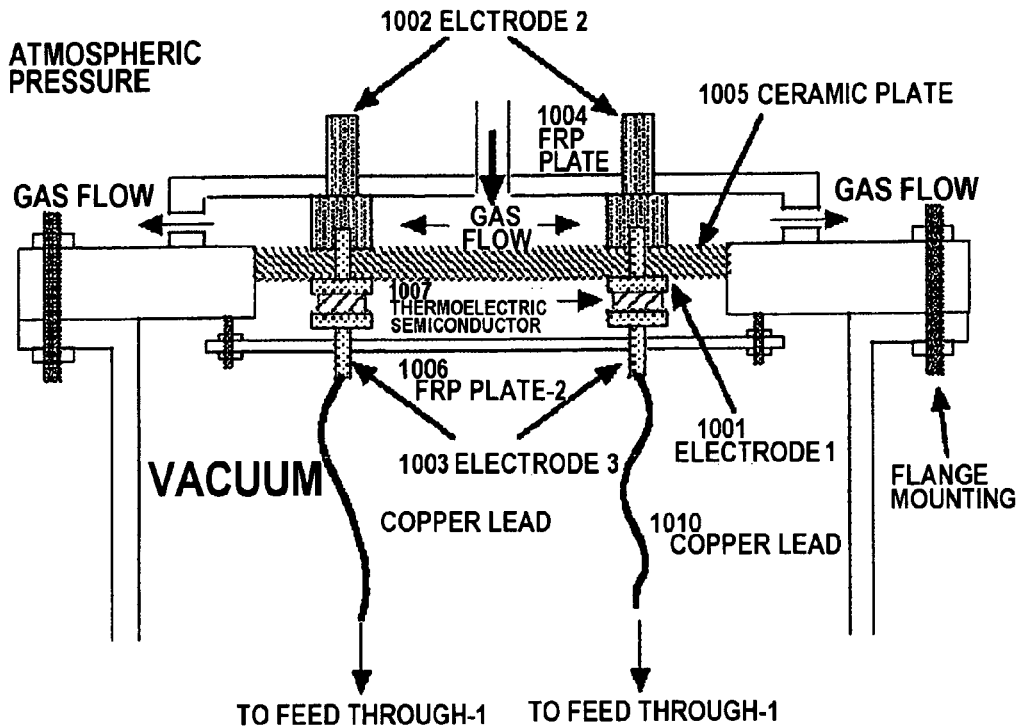

FIG. 16 shows the overall structure of a feed-through 2 in another embodiment of the present invention.

Figure 17:
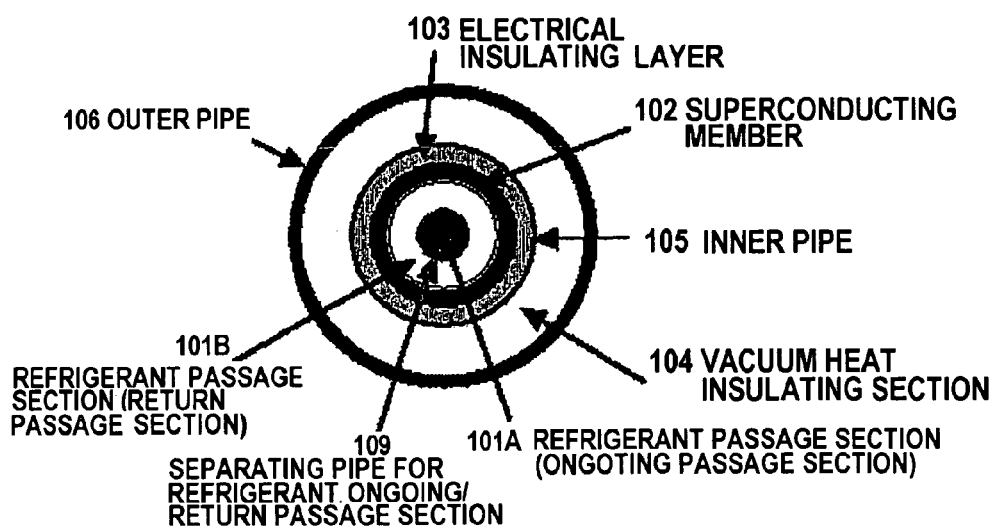

FIG. 17 shows the cross-section of a coaxial cable structure according to a further embodiment of the present invention.

Figure 18:
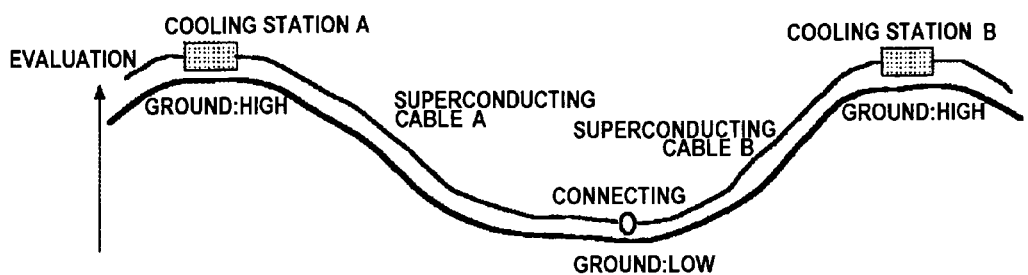

FIG. 18 shows an arrangement of a cooling station in a further embodiment of the present invention.

Figure 19:
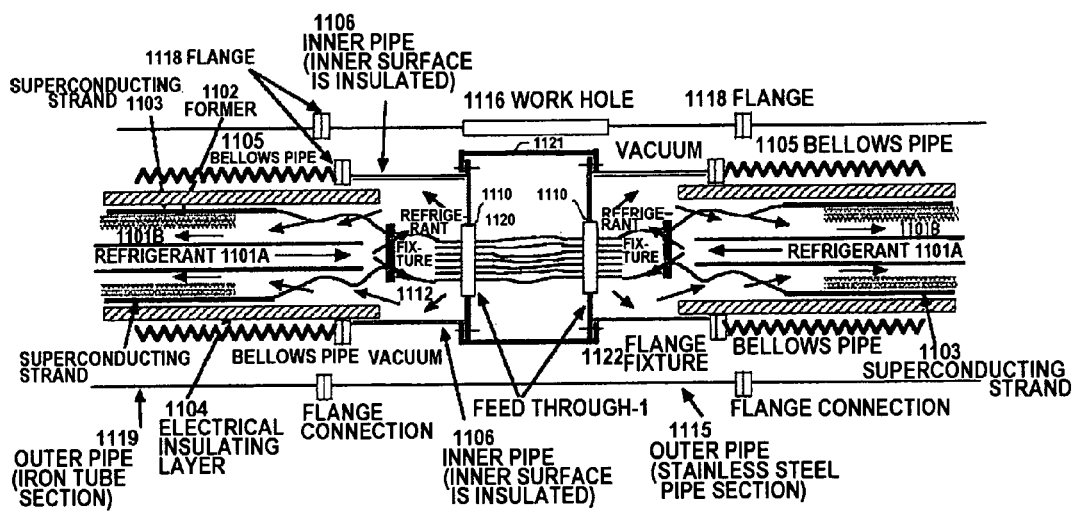

FIG. 19 shows the structure of a cable connecting portion of FIG. 18.

Figure 20:
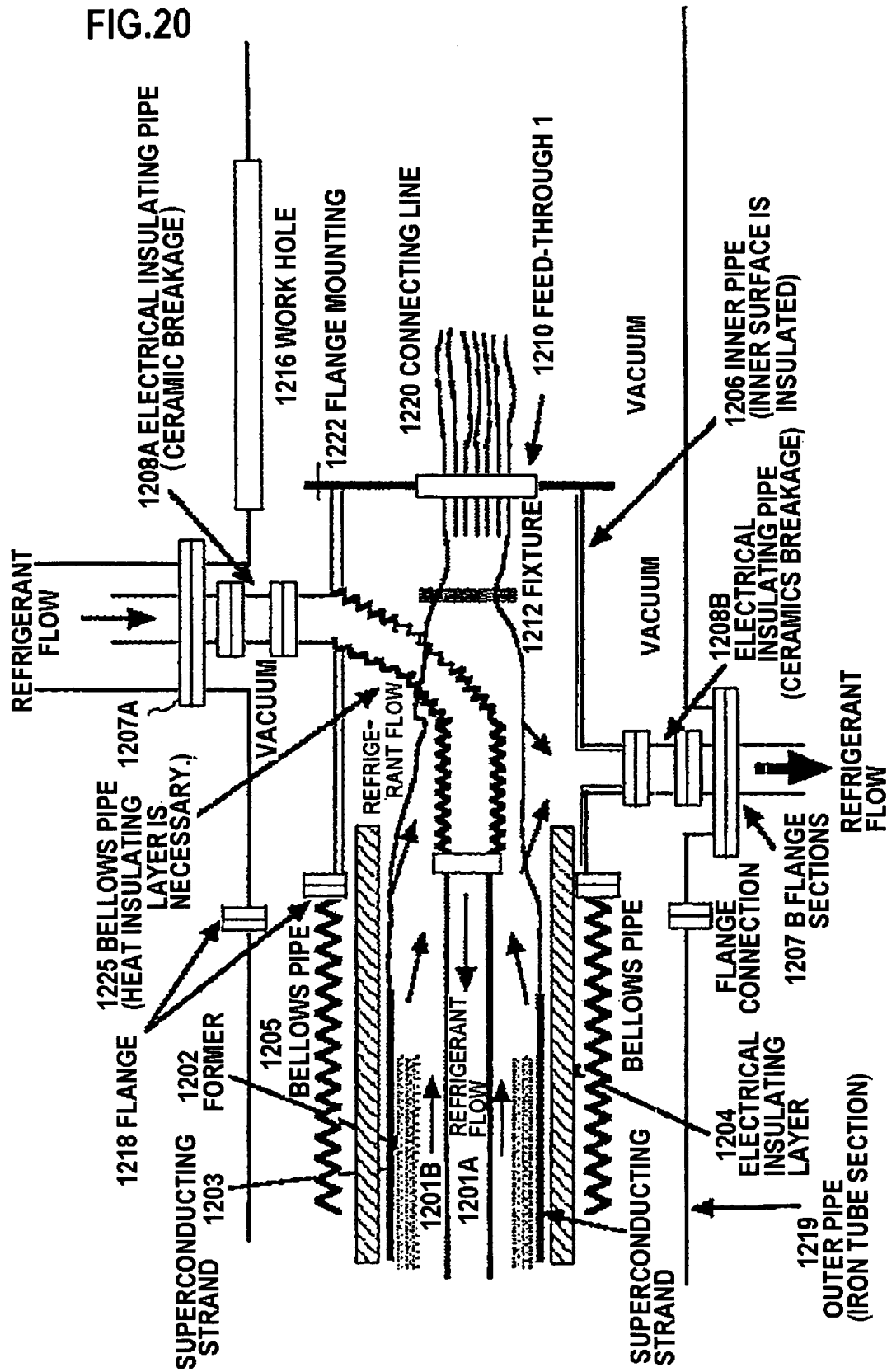

FIG. 20 shows the structure of a refrigerant inlet.

Figure 21:
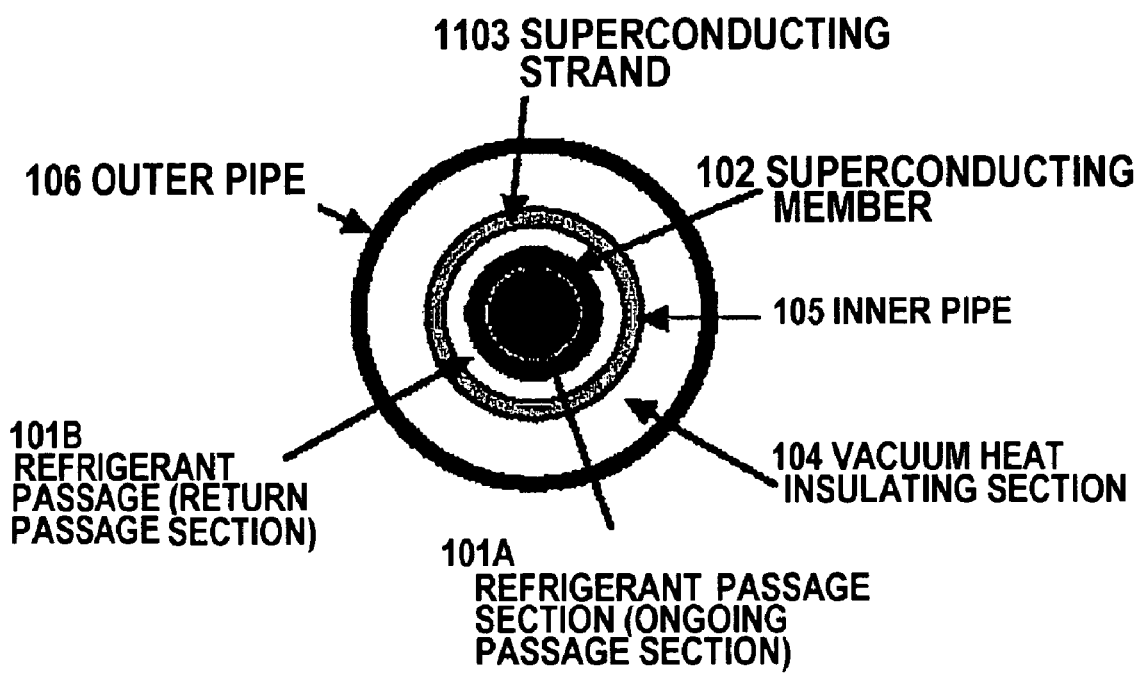

FIG. 21 shows the cross-section of a coaxial cable structure according to a further embodiment of the present invention.

PREFERRED EMBODIMENTS OF THE INVENTION

Figure 1:
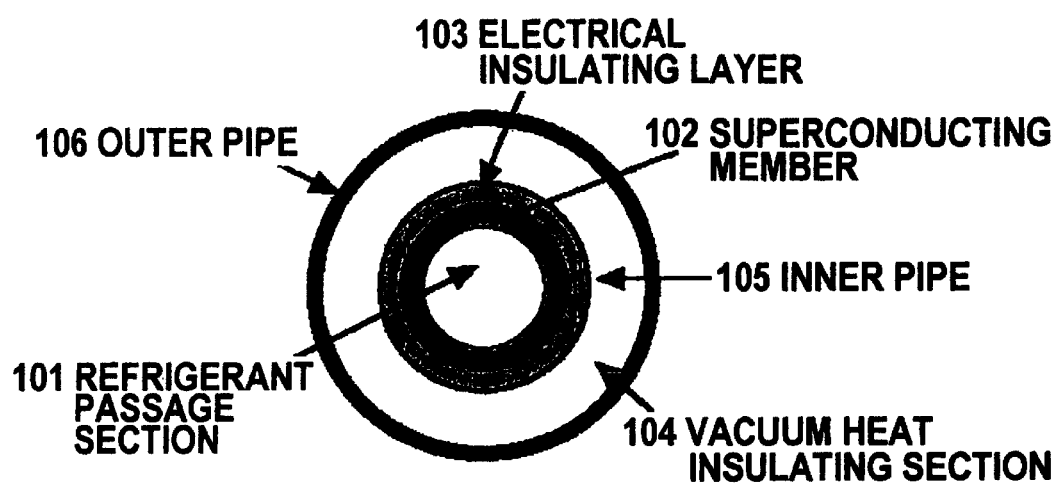
FIG. 1 shows the cross-section of a pipe according to an embodiment of the present invention.

Preferred embodiments of the present invention will now be explained. FIG. 1 shows the structure of an embodiment of the present invention and specifically shows a heat insulating pipe employing an iron pipe. The structure is now explained beginning from an inner side. The innermost side of the structure is a refrigerant passage section 101 which, in the present instance, is in the form of a straight pipe. In general, the refrigerant flows through the inside of a pipe termed ('former').

About this former is wrapped (or wound) a superconducting wire (strand) to form a superconducting member 102. In case a refrigerant at the liquid nitrogen temperature is used, the superconducting wire is formed of a material termed 'high temperature superconductor (HTS)'. Usually, the material is an oxide material, and worked to a tape shape. In order for the refrigerant and the tape wire material to have direct contact with each other, fine openings (e.g., holes or slits) are bored in the former.

The superconducting wire is covered up by an electrical insulating layer 103 serving for electrical insulation. Such a material that will simultaneously serve for heat insulation is used for the electrical insulating layer 103. In general, an electrical insulating material is simultaneously low in thermal conductivity and hence is liable to meet this condition of heat insulating properties.

The above structure (the refrigerant passage section 101, superconducting member 102 and the electrical insulating layer 103) is introduced into an inner pipe 105. The material of the inner pipe 105 is e.g. stainless steel, because the inner pipe 105 is at a low temperature. Since the low temperature prevails up to the inner pipe 105, which inner pipe is subjected to thermal contraction, this inner pipe should be ones that can allow thermal contraction, preferably a bellows pipe.

On the outer side of the bellows pipe is a vacuum layer (vacuum heat insulating section) 104. An outer pipe 106 is provided for maintaining this vacuum. The outer pipe 106 is at an ambient temperature and, as a material for this outer pipe, a ferromagnetic material, such as iron, is used.

Up to now, stainless steel was used as a material for the outer pipe. However, if the ferromagnetic material is used, the inductance proper to a power transmission line is increased because the material has high magnetic permeability. It is among the characteristics of the present invention to increase the magnetic energy retained by the power transmission line.

In the conventional system, the configuration of employing an iron pipe as such vacuum pipe is not used. Several requirements, as now explained, are currently raised in implementing an iron pipe as such vacuum pipe.

Since the outer pipe of iron is rusted on oxidation, the outer surface of the pipe is subject to, e.g., plating plated by way of a rust-proofing operation.

The outer surface of the outer pipe is covered up with a rubber material to avoid impact or damages.

Since the ratio of gas emission from the surface of the outer pipe needs to be lowered to maintain the vacuum, the inner surface of the outer pipe is subjected to surface-treatment, e.g., processing plating or vapor deposition.

Moreover, the radiation ratio needs to be lowered in order to maintain the low temperature.

For the above reason, aluminum may preferably be vacuum deposited on the inner surface. Otherwise, a method consisting in inserting plural thin films, termed 'super-insulation', in the vacuum layer to diminish the intrusion of the radiation heat, is customarily used.

Figure 2:
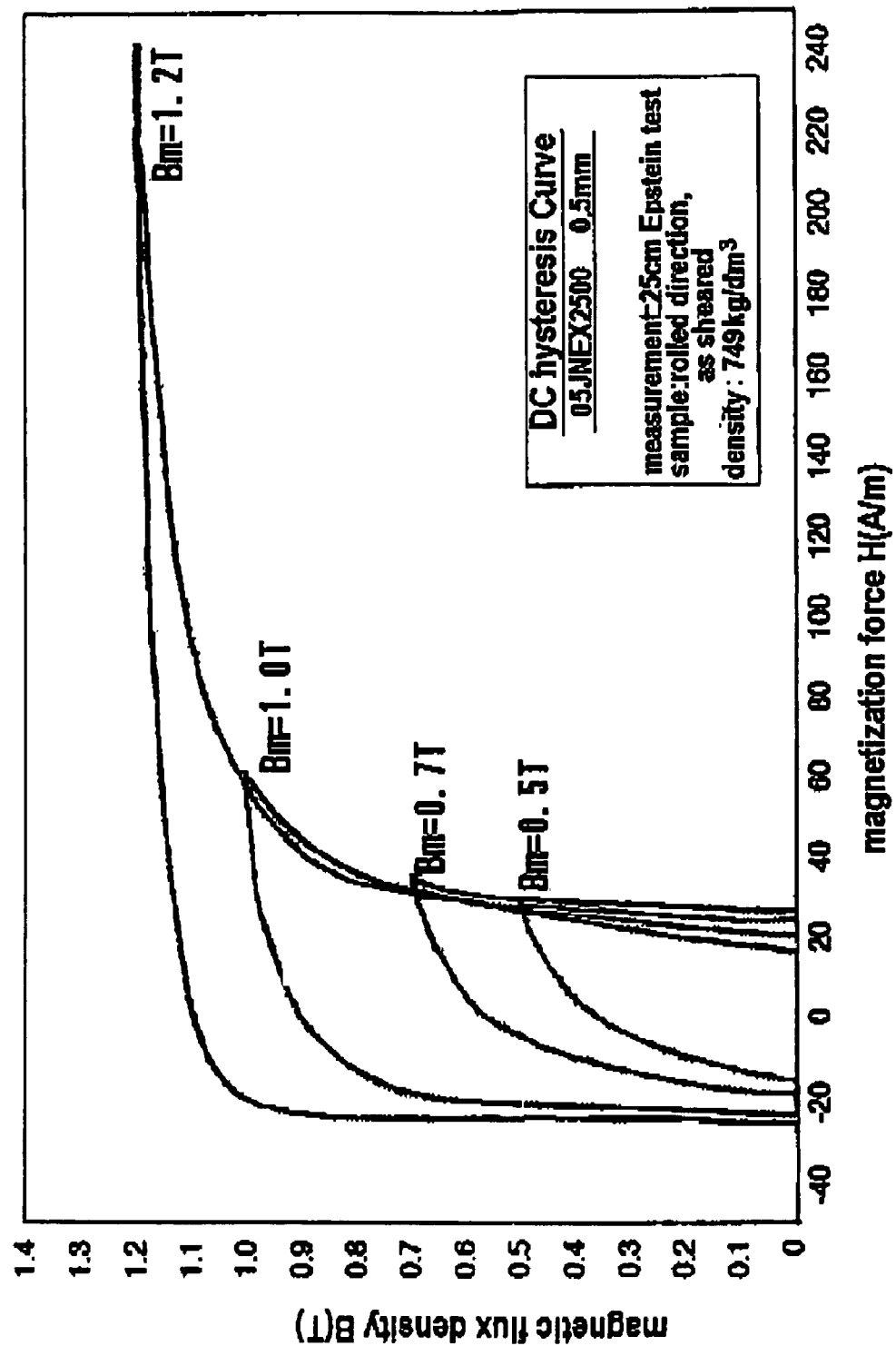
FIG. 2 shows an example of magnetic characteristics of a grain oriented silicon steel plate.

Next, magnetic properties of the iron pipe as a ferromagnetic material are explained. In general, the magnetic properties are indicated by a BH curve. FIG. 2 shows typical magnetic properties (magnetic properties of directional silicon steel plate). This is in the form of a hysteresis curve which appreciably differs with the maximum value of the applied magnetic field.

FIG. 3 schematically illustrates magnetic properties of a ferromagnetic material. When initially a magnetic field H is applied, a start point is the point of origin 0. When the magnetic field reaches a value H1, the magnetic flux density B reaches a maximum value. The magnetic flux density B at this time is termed the 'maximum magnetic flux density Bm'. In FIG. 3, this is represented by a characteristic curve (1).

When next the magnetic field is lowered, the characteristic curve undergoes transition until the magnetic field becomes equal to zero. In the drawing, BO is termed the 'residual magnetic flux density'. This transition not following the first curve is termed 'hysteresis'. On the second magnetization, the transition is not a complete replica of the curve (2), however, it follows substantially the curve (2). On demagnetization, the transition substantially follows the curve (2). The transition is indicated by arrows.

Thus, if the iron pipe is used as the outer pipe 106, as shown in FIG. 1, the magnetic field H is changed with changes in the current flowing through the inner superconductor. The magnetic properties may be deemed to be such that, except during the beginning phase, the transition substantially follows the characteristic curve (2) of FIG. 3.

The magnetic energy W, held by the magnetic material, is given by the following equation (1):

$$W = \int_{B0}^{Bm} H dB \quad (1)$$

Hence, the value of the electrical current is changed appreciably depending on whether the characteristic curve is (1) or (2) of FIG. 3, with the magnetic energy W being larger and smaller with the characteristic curves (1) and (2), respectively. With this d.c. characteristic, the value of employing a magnetic material is low.

Thus, the characteristics such as characteristics (3) shown in FIG. 3 are desirably able to be obtained by some method or other. In short, the residual magnetic flux density BO is desirably lowered. Meanwhile, if e.g. stainless steel is used in place of a magnetic material, the above-described hysteresis characteristics are not demonstrated, with the B-H curve passing through the point of origin and undergoing linear transition.

Figure 4:
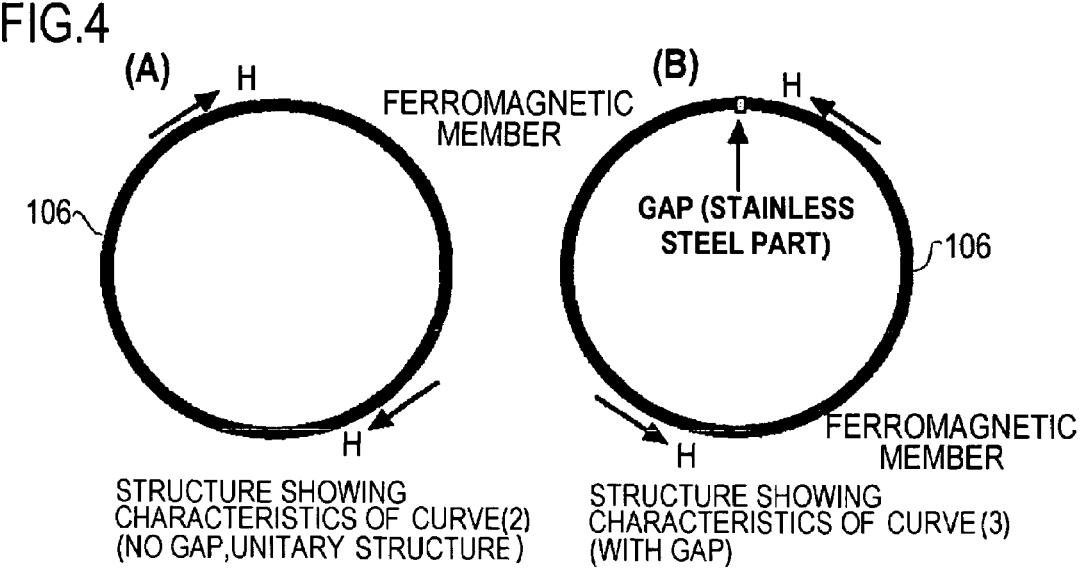

The magnetic characteristic, shown by the characteristic curve (3) of FIG. 3, may be implemented by a magnetic circuit of the outer pipe shown in FIG. 4. A magnetic circuit is formed in a circular form corresponding to the cross-section of the pipe.

The magnetic field H is shown on the assumption that the current flows through the superconductor on the inner side of the pipe 106 in a direction perpendicular to the drawing sheet. The magnetic induction (magnetic flux density) B may also be implemented by inserting a gap in the same direction. Lacking this gap, characteristics shown at (2) are achieved.

On the other hand, the outer pipe plays the role of maintaining the vacuum and hence is not to be spatially void. By employing a non-magnetic material, such as stainless steel, for the gap part, the material operates magnetically as a gap, while being able to maintain the vacuum. For providing the cross-section, such as is shown in FIG. 4B, a plate material is bent to a pipe, in fabricating the outer pipe 106 (see FIG. 1), and a non-magnetic material is clamped therein, with the components then being welded together. Meanwhile, the gap which is as short as possible is desirable, because the maximum magnetic flux density Bm is decreased even on applying the same magnetic field H1. Thus, in actual designing, these characteristics should be taken into consideration.

The outer pipe 106 of the composite structure is now scrutinized. There are two roles to be performed by the outer pipe 106.

The first role is heat insulation in vacuo.

The second role is retention of the magnetic energy.

It is possible to separate these two functions from each other. FIG. 5 shows an instance. In FIG. 5A, the outer pipe 1 (106) is used for maintaining the vacuum, while the outer pipe 2 (107) is used for maintaining the magnetic energy. Hence, the outer pipe 1 may be fabricated from thin bellows with ease in bending and in mounting. A cushioning member 108 may also be arranged between the two pipes 106, 107. If the cushioning member 108 is formed of a low thermal conductivity material, it may also be used for heat insulation.

The outer pipe 2 (107) may be split in two pieces which can be jointed, e.g., by screws. The two pieces of the outer pipe 2 are abutted and connected to each other, as shown in FIG. 5B.

Since the outer pipe 2 is of an increased thickness, there may be provided a structural section holding the entire structure.

Such a case where a single superconducting cable is mounted in a multi-purpose underground conduit will now be explained. FIG. 6 schematically shows an illustrative cross-section of a mounting structure in the multi-purpose underground conduit. Since the current flows in opposite directions in two superconducting cables 201 in the multi-purpose underground conduit, a magnetic field is generated across the two cables and may exit broadly to the exterior. It is because the cable system has a large magnetic energy. Moreover, since the Japanese domestic legislation provides that the magnetic field needs to be 5 G or less in an area where people at large come and go, magnetic shielding needs to be applied effectively. The electromagnetic force acts repulsively across two cables. Since the repulsive forces increases in proportion to the square of the current, the two cable need to be secured together by supporting means. For solving this problem, it is sufficient to interconnect the two superconducting cables 201 by a steel plate (e. g, electromagnetic steel) 202. The electromagnetic force, acting across the two superconducting cables 201, is sustained by the steel plate 202 and, in addition, since the plate is formed of ferromagnetic material, such as iron, magnetic shielding may be achieved simultaneously. This further raises the magnetic energy that may be sustained. Similar effects may also be achieved using an iron material for the walling of the multi-purpose conduit. This conduit is not necessarily covered up completely.

Since there is placed limitation on the length of a straight pipe as the superconducting cable, a plural number of the straight pipes need to be interconnected to a preset length. The length of the straight pipes, thus interconnected, needs to be secured or supported at plural points. However, if earthquakes or ground sinking are taken into consideration, it may be an occurrence that, if the entire lengths of the pipes is secured rigidly, the electrical conductors be ruptured under a locally applied excessive force. For avoiding this problem, it is sufficient to use bendable flexible bellows tube at the connecting portions of the neighboring unbendable straight pipes. The resulting structure may then be secured and supported at the straight pipe sections, as shown for example in FIG. 7. In the case of FIG. 7, the straight pipe sections, which are iron pipes forming the outer pipe, are each supported at two points by electrical cable/pipe supports 302. The ends of the straight pipe sections are interconnected by flexible bellows tubes 303.

A cable structure in case of power transmission employing the above-described superconducting cable will now be explained. FIG. 8 shows the structure of the superconducting cable by a single core superconducting cable. The cable structure is made up by two superconducting cables 401, 402 and a single copper cable 403 which is formed of a normal electrically conductive material. There are provided electrical power sources 1 and 2, each of which comprises an a.c. generator, to which is connected an inverter or a converter and which is adapted for outputting the d.c. current, in order to cause the current to flow, as shown in FIG. 8 (see current 1, current 2 and current 1–current 2). The power source 1 (404) is connected across one end of the superconducting cable 401 and one end of the copper cable 403, and the power source 2 (405) is connected across the one end of the copper cable 403 and one end of the superconducting cable 402. An inverter 1 (406) is connected across the other end of the superconducting cable 401 and the other end of the copper cable 403, and an inverter 2 (407) is connected across the other end of the copper cable 403 and the other end of the superconducting cable 402. The other end of the copper cable 403 and a connecting node between the inverters 1 and 2 (node B) are grounded. An a.c. output is obtained at the inverters 1 and 2. Since the current flowing through the copper cable 403 is the difference of the currents flowing through the superconducting cables 401, 402 (current 1–current 2), the current value is extremely small. That is, the Joule's loss is extremely small. The inverters 406, 407 may also be controlled so as to render the current flowing through the copper cable 403 substantially zero. By so doing, the cross-sectional area of the copper cable 403 may be reduced such that the power transmission is scarcely affected even though the resistance is high.

Moreover, since the node B is grounded, the potential of the copper cable 403 approaches to the ground potential, so that a low insulation voltage may be used for the copper cable 403. The superconducting cables are expensive, however, with the structure of the present embodiment as shown in FIG. 8, not all of the cables need to be superconducting cables. That is, with the present embodiment, an inexpensive transmission system may be constructed without compromising the power transmission efficiency.

In the embodiment shown in FIG. 8, the copper cable 403 is provided as a distinct member from the superconducting cables 401, 402. Alternatively, a copper part may be annexed to the outer pipe of the superconducting cable, to cause the current to flow through the copper part, in which case the cable laying operation of laying only two superconducting cables suffices.

The operation in case an accident has occurred in the present system is now scrutinized. As the accident, the following three cases are presupposed. The first case is an accident in a commercial a.c. system, the second case is an accident on the superconducting cable and the third case is an accident in the inverter.

In FIG. 9, switches SW3 and SW4, connected to output destinations of the inverters 406, 407, are changeover switches, and are normally connected to the commercial a.c. output side. If a shorting accident has occurred in the a.c. output destination, the inverter driving mode is changed to halt the outputting. Since the inverter used is of the self arc extinguishing type, this output halting may be achieved instantaneously. Since the large current consequent on accident occurrence does not flow through the commercial system, the operation is superior in soundness as compared to the system employing a mechanical interrupter.

It is then assumed that an accident has occurred on the superconducting cable. In this case, the current flowing through the superconducting cable needs to be reduced to zero as promptly as possible. In this case, the current output from the power sources 1, 2 is halted. This can be achieved instantaneously because inverters are used. The switches SW1 and SW2 are then turned on to permit circulation of the current. The inverter outputs are reduced to zero, at the same time as the changeover switches SW3, SW4 are changed over and connected to a dummy output side (dummy resistors). The operation of the inverters 406, 407 is changed over to permit the d.c. current to flow to the dummy output sides. Thus, the electrical energy owned by the system is consumed by the resistors, so that the current flowing in the superconducting cable is decreased promptly.

The measures to be taken against an inverter accident will now be explained. An inverter accident, assumed to be routine, is the shorting of the semiconductor device. At this time, the d.c. current continues to flow. In FIG. 9, the inverters (inverters 406, 407) are shown on only one side for simplicity. In practice, the inverters are provided on both sides of the cables. The same may be said of the switches SW1, SW2. If the switch connected parallel to the malfunctioning inverter is closed, no current flows through the malfunctioning inverter portion and the remaining sound inverter may then execute the interrupting operation to forestall an impending grave accident.

The cable of the above-described embodiment is of a single line. A cable structure in which two conductors are accommodated on the same axis will now be explained. FIG. 10 depicts a cross-sectional view of a cable structure of a modification of the present invention. The two conductors of the coaxial cable are insulated from each other and a ferromagnetic material is arranged in position. The coaxial cable is featured by not allowing the magnetic field to leak to outside, by sustaining the electromagnetic force within the cable and by having only low impedance. Although the former two features are desirable in utilizing the cable as the power cable, the low impedance straightforwardly means the low inductance.

The inductance may frequently be as low as $1/100$ or less of that in case two cables are arranged at a spacing of four (or several) meters parallel to each other. The result is that the magnetic energy that can be held by the cable is diminished.

Thus, two conductors on the forward and return paths, that is, a conductor on a forward path and a conductor on a return path (superconducting cable +(502) and superconducting cable −(505)), are electrically insulated from each other, and a ferromagnetic member 504 is arranged in-between.

Referring to FIG. 10, an inner refrigerant passage 501 is provided on the innermost side to permit the refrigerant to flow in a predetermined direction. This inner refrigerant passage 501 is made up by a former, around which the superconducting cable +(502) is wound, and an inner bore in the former. The former is provided with small openings or slits for the refrigerant to have direct contact with the superconducting wire. The superconducting wire may be an insulated wire. The resulting product is wrapped by an electrical insulator 1 (503). The electrical insulator 1 (503) insulates the large voltage applied to the conductors on the forward and return paths. The electrical insulator 1 (503) is preferably grounded. A superconducting cable −(505) then is wrapped in position via a simple electrical insulating part (not shown). The superconducting cable −(505) is similarly grounded.

An electrically insulating part 2 (506) is provided on an outer part of the superconducting cable −(505) to accommodate the resulting structure in the inner pipe 509. A vacuum heat insulator 508 is provided between an inner pipe 509 and an outer pipe 510. A magnetic gap may also be provided for the ferromagnetic material 504.

The ferromagnetic structure, interposed between the conductors on the forward and return paths (superconducting cable +(502) and superconducting cable −(505)) of FIG. 10, is now explained. Since the cable is a bendable conductor, this ferromagnetic structure needs to be bendable, even though the outer pipe is not. Consequently, straight pipe sections are not usable. Hence, the ferromagnetic structure is in the form of a ring 504, as shown in FIG. 11A. A plural number of these rings 504 are interconnected by connecting wires 511. These connecting wires are formed of a spring material that may not only be bent in optional directions but may be elongated or contracted within a limited extent. These connecting wires are used for interconnecting the ferromagnetic rings 504.

An ambient temperature end structure of the present embodiment is now explained. FIG. 12 shows the structure of the ambient temperature end structure. Referring to FIG. 12, a superconducting strand 603 is wound/wrapped around a former 602. Within the former 602 flows a refrigerant 601. An electrical insulating layer 604 is provided on the outer side of the superconducting strand 603, and the resulting product is accommodated in its entirety in a bellows tube 605.

At an end part, a bellows pipe 605 is mounted via a flange 618 to an inner pipe 606 on the inner side of which is fitted an electrical insulating layer. This is used for electrical insulation of the inner pipe. To the side opposite to the side of the inner pipe 606, connected to the bellows pipe 605, is connected a flange 609 carrying thereon a feed-through 1 (610). A flexible conductor is at its one end connected to each of plural pins of the feed-through and the other end thereof is each connected to the superconducting strand 603. The conductor (copper leads) is secured in position by a fastener 612 formed of an insulating material. This conductor also has its surface electrically insulated, so that optimum insulation from the inner pipe 606 may be maintained. By the similar reason, the inner side of the flange 609, to which the feed-through 1 (610) is mounted, is insulated.

A pipe formed of an electrical insulating member 608, termed a ceramic brake, is mounted via a flange to a conduit for supplying the refrigerant to the inner pipe system and an electrical insulation is established with respect to the external cooling system. Since the electrical insulating material, such as ceramics, usually differs in coefficient of thermal contraction from metal, a bellows tube, not shown, is used for absorbing the differential in thermal contraction. The inner pipe system is provided within the vacuum of the outer pipe system.

An end of an outer pipe section 615 is formed of stainless steel and is connected to an iron pipe section 619 (ferromagnetic material) via a flange 618.

A work hole 616 is provided to the end of the outer pipe section 615 (stainless steel part) as necessary, for improving its workability. A conduit for evacuation is connected to this work hole 616 and a vacuum pump, for example is mounted in position, with the aid of this work hole.

To an end of the outer pipe section 615 (stainless steel tube) is mounted a flange 613, a feed-through 2 (614) is connected to, and a wire having an insulation coating thereon is used to interconnect each pin of the feed-through 1 and each pin of the feed-through 2. Since a large temperature difference is encountered, it is necessary to make flexible interconnection with allowance. On the ambient temperature side, a thermoelectric semiconductor (Peltier element) 617 is provided for reducing the heat intrusion. The detailed structure will be explained in detail subsequently.

In an embodiment of FIG. 12, the refrigerant inlet is directed downwards, with the refrigerant flowing from the inlet side. Since the refrigerant flows out at the opposite end, the outlet is directed upwards. If heat insulation to the low temperature side is significant, the gas generated tends to be discharged with rise in temperature, and the liquid refrigerant with a higher temperature is low in density. This accounts for the reason that this structure is used.

FIG. 13 shows a structure in which the ambient temperature side in its entirety is directed in the up-and-down direction. Since a refrigerant 71 is lowered in density on temperature rise caused by heat intrusion, it is desirable that the refrigerant influx side and the refrigerant efflux side are provided in a lower position and in an upper position along the gravity operating direction, respectively. In particular, should it be feared that the refrigerant may be gasified by some reason or other, it is desirable that the refrigerant efflux side is provided in an upper position. FIG. 13 shows the ambient temperature side from which flows out the refrigerant. The connection of the power system is made in the up-and-down direction, with the refrigerant flowing out from a lateral side of the pipe. It is however desirable that this relationship is reversed (i.e., horizontal power connection and upward outlet). The reason is that, should the gas be evolved, the gas will flow upwards. The structure shown is electrically insulated in its entirety from the refrigerant producing pump system by an insulating pipe, as in the structure shown in FIG. 12.

Both the low temperature inner pipe and the ambient temperature outer pipe are set to a ground potential to provide for safety of the workers. The bellows pipe 705 is electrically insulated and multiplex insulation is provided at the pipe end section as shown. The inner surface of the outer pipe 719, facing the inner pipe 706 for heat insulation in vacuum, has its surface plated or otherwise worked for smoothing for raising the reflectivity of infrared rays. On the inner pipe 706 is wound/wrapped a thin film, termed 'super-insulation', for reflecting heat radiation from outside.

A copper lead 720, connected to a thermoelectric semiconductor 717, needs to be electrically insulated from other equipment. Consequently, the surface of the copper lead 720 is insulated and an electrical insulating layer is provided on the vacuum side surface of other equipment mounted in vacuum.

The structure of the feed-through 2 is now explained. Use of the thermoelectric semiconductor reduces heat intrusion to the lower temperature part. On the other hand, if the thermoelectric semiconductor is used, heat is transported from the low temperature side towards the high temperature side, so that, except if the ambient temperature side is subjected to cooling, the ambient temperature side is raised in temperature. Moreover, the thermoelectric semiconductor in general is more brittle than metal, such that attention needs to be paid to a connecting portion.

FIG. 14 shows the structure of the feed-through 2 and specifically shows an electrode structure the thermoelectric semiconductor is mounted to. An electrode 1 (801) and an electrode 2 (802) are mounted on both sides of a ceramic plate 803. These may be mounted to one another by threading. The electrode 1 (801) is metallized on a plate of ceramics 803 for maintaining the vacuum. Since a cable from the power supply is connected to the electrode 2 (802), an FRP (fiber reinforced plastics) plate 804 is mounted on the upper surface of the electrode 2 (802) for securing the electrode 2 (802). A fin 805 is mounted to the electrode 2 (802) for securing the electrode 2 (802). On this electrode 2 (802) is mounted a fin 805 providing for heat exchange by a cooling gas flowing between the FRP plate 804 and the plate of ceramics 803. This dissipates heat accumulated in the thermoelectric semiconductor.

Moreover, these electrodes are insulated from one copper lead to another and are mounted on plural feed-throughs, respectively (see FIG. 16).

The thermoelectric semiconductor, mounted to the electrode 1 (801), will now be explained. The thermoelectric semiconductor used is e.g. a bismuth-tellurium alloy (BiTe). This bismuth-tellurium alloy is soldered to the copper electrode. The surface of the copper electrode, for example, needs to be pre-treated. Since BiTe is not so strong as metal and the connecting surface thereof is fragile, a suitable support member is needed following the bonding.

FIG. 15 shows another structure of the feed-through 2. An electrode 3 (903), bonded to a lower part of a thermoelectric semiconductor 808, is supported in its entirety by an FRP plate-2 (907). A thermoelectric semiconductor 908, the electrode 3 (903) and the FRP plate-2 (907) are mounted in vacuo. A copper lead 910 is connected to the electrode 3 (903) for connection to the feed-through 1.

FIG. 16 shows an entire structure of a feed-through 2 of the present embodiment. A plural number of the thermoelectric semiconductors, shown in FIGS. 14 and 15, and the electrode structures, connected thereto, are mounted on a single plate of ceramics. If these components are arrayed concentrically, the copper lead and the superconducting cables may be interconnected extremely readily. Since the heat is transported from the low temperature side to the high temperature side under the Peltier effect of the thermoelectric semiconductors, an electrode 2 (1002) rises in temperature if no measures are used. For averting this, there is provided a structure for circulating the gas for cooling. Following heat exchange, the gas is ejected to outside. Since the connection between a thermoelectric semiconductor 1007 and an electrode is not so strong, an electrode 3 (1003) is supported by an FRP plate 2 (1006). Since the electrode 3 (1003) is at a low temperature, a lower thermal conductivity of the FRP plate is preferred. For averting heat intrusion by heat radiation, the electrode surface is coated with aluminum. The same applies for the electrode 3. That is, the electrode 3 has its surface coated with a material exhibiting high reflectivity.

As a modification of the present invention, a cooling system for a superconducting cable will now be explained. In d.c. transmission, heat generated in the single superconducting strand is not so high as that in a.c. transmission. Heat intrusion to the low temperature system is solely that via the vacuum heat insulating portion and via the end portion. For cooling, circulation of the refrigerant is needed, so that the pump motive power for this refrigerant circulation is increased. Since the pump needs to be driven in the refrigerant, the entire heat generated by the motive power operates as a load to the low temperature system. In the development of the state-of-the-art a.c. superconducting cable, it has empirically been proved that this motive power represents a significant factor of the thermal load.

As specified means for solving this problem, attempts are made for decreasing the pump motive power. The needed refrigerant quantity is determined by the heat intrusion into the low temperature system. Pressure losses for refrigerant circulation are determined by the design of the conduit in which flows the refrigerant. As a basic concept, attempts are made towards reducing the motive power, needed in refrigerant circulation, by exploiting the gravity, as now explained.

FIG. 17 shows the cross-section of a cable according to a further embodiment of the present invention. The refrigerant passage is divided into an ongoing passage section 101A and a return passage section 101B. A separation pipe 109 is provided between the ongoing passage section 101A and the return passage section 101B.

With this structure, the wall area of the pipe making up the flow conduit is generally increased, thus usually increasing the pressure losses. The low temperature slush nitrogen, supplied from a refrigerator, not shown, is caused to flow through a center portion of the pipe, acting as the ongoing passage section 101A. Since the slush nitrogen includes nitrogen ice, the average density of the refrigerant is high. On the other hand, the return passage section 101B is designed so that the refrigerant may directly contact the superconducting wire material. The result is that the nitrogen ice melts due to heat intruded from outside to lower the refrigerant density.

A number of cooling stations for supplying the refrigerant to the cable need to be installed at a preset distance, for example, at an interval of 20 km, from one another. Since the ground height difference occurs, the cooling stations are mounted at an altitude. FIG. 18 schematically shows an arrangement of cooling stations. A superconducting cable A, extending from a cooling station A, and a superconducting cable B, extending from a cooling station B, are interconnected on the ground of a low altitude on which the cable is laid (connecting portion). The current flows through the cooling stations. The refrigerant, which has entered the ongoing cooling passage section of the cable from the cooling stations A, B, has its path reversed at the connecting portion and is returned via the return passage section to the source cooling station from which the refrigerant flow originated.

FIG. 19 shows the structure of the connecting portion of FIG. 18. The refrigerant containing a large quantity of nitrogen ice, high in density, descends by its own gravity from the cooling station. Conversely, the refrigerant high in temperature due to nitrogen ice melting, due in turn to heat intrusion, is subjected to a buoyant force by its low density, at the same time as it is thrust by the descending refrigerant. Thus, the refrigerant high in temperature is returned to its source cooling station. The result is the diminished motive power needed for refrigerant circulation.

Since the above-described structure is able to exploit the siphon principle, refrigerant circulation occurs ultimately, even though there is a site partway which is higher in altitude than the cooling station, provided that the connecting portion is at a lower altitude than the cooling station. If large heat intrusion occurs by some accident, heat is first intruded into the refrigerant flowing in the return passage section. Even if a gas is evolved from this site of heat intrusion, the refrigerant is returned by the buoyant force to the original cooling station, thus assuring intrinsic safety.

Referring to FIG. 19, a bellows pipe 1105 at a low temperature is provided inwardly of an outer pipe, adapted for vacuum heat insulation, and a superconducting strand, shown by a cross-section in FIG. 17, is provided on the inner side of the bellows pipe. A feed-through 1 (1110) is connected to a terminal straight pipe (inner pipe) for connection, and each superconducting strand is connected to each pin of the feed-through 1 (1110). The pins on both sides of the feed-through 1 (1110) are electrically interconnected via connection lines 1120. The two inner pipes 1106 are mechanically securely interconnected by connection metal fixtures 1121. On the other hand, the refrigerant flows from the ongoing passage section 1101A at the core of the cable towards the connecting portion and has its flow direction reversed at an end structure. The refrigerant is returned on the return passage section 1101B to the source cooling station. In FIG. 19, arrows stand for the refrigerant flowing directions.

FIG. 20 shows the structure of a refrigerant inlet in the cooling station. The refrigerant inlet system is directly coupled to an ongoing passage section 1201A of the cable and, from a return passage section 1201B, is connected to an inner pipe 1206 in its entirety. When the refrigerant is introduced, a bellows pipe 1225 is preferably used for facilitating the connection, installation and working. For prohibiting heat exchange with the refrigerant returned after circulation, the bellows pipe 1225 may be of a dual wall structure to provide a vacuum layer or an insulating material may be provided on the bellows pipe 1225.

FIG. 21 shows a cross-sectional structure of a pipe according to a further modification the present invention. FIG. 21 shows, as a pipe structure for assuring natural circulation, a structure which is different from that shown in FIG. 17. In the ongoing passage section 101A of the refrigerant passage, the refrigerant is caused to flow on the inner side of the former the superconducting strand is wrapped on. In the return passage section 101B of the refrigerant passage, the refrigerant is caused to flow on the outer side of the conductor 102 formed by a superconducting strand. By so doing, the superconducting member 102 is cooled both from its inner and outer sides. Since the heat from outside is first intruded into the refrigerant in the return passage section 101B, the superconducting state may be maintained more stably. In addition, separation between the ongoing passage section 101A and the return passage section 101B of the refrigerant passage may be achieved more reliably.

Although the present invention has been explained with reference to preferred embodiments thereof, the present invention is not limited to these merely illustrative embodiments and may encompass various changes or corrections that may be arrived at by those skilled in the art within the scope of the invention as defined in the claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

EXPLANATION OF NUMERALS

101 refrigerant passage section
101A refrigerant passage section (ongoing passage section)
101B refrigerant passage section (return passage section)
102 superconducting member
103 electrical insulating layer
104 vacuum heat insulating section
105 inner pipe
106 outer pipe (outer pipe 1)
107 outer pipe (outer pipe 2)
108 cushioning section
201 superconducting cable
202 steel plate for magnetic shielding
301 straight pipe section
302 cable/pipe support
303 bellows pipe section
401 superconducting cable 1
402 superconducting cable 2
403 copper cable
404 power supply 1
405 power supply 2
406 inverter 1
407 inverter 2
501 refrigerant passage section
502 superconducting cable +
503 electrical insulator 1
504 ferromagnetic member
505 ferromagnetic conductor −
506 electrical insulator 2
507 external refrigerant passage section
508 vacuum heat insulating section
509 inner pipe
510 outer pipe
511 connecting wires
601 refrigerant
602 former
603 superconducting strand
604 electrical insulating layer
605 bellows pipe
606 inner pipe
607 flange
608 electrical insulating pipe (ceramic breakage)
609 flange mounting
610 feed-through 1
612 fixture
613 flange mounting
614 feed-through 2
615 outer pipe (stainless steel pipe section)
616 work hole
617 thermoelectric semiconductor
618 flange
619 outer pipe (iron pipe section)
701 refrigerant
702 former
703 superconducting strand
704 electrical insulating layer
705 bellows pipe
706 inner pipe
707 flange
708 electrical insulating pipe (ceramic breakage)
709 flange mounting
710 feed-through 1
712 fixture
713 flange mounting
714 feed-through 2
715 outer pipe (stainless steel pipe section)
716 work hole
717 thermoelectric semiconductor
718 flange
719 outer pipe (iron pipe section)
801 electrode 1
802 electrode 2
803 ceramic plate
804 FRP plate
805 fin
901 electrode 1
902 electrode 2
903 electrode 3
904 FRP plate
905 fin
906 ceramic plate
907 FRP plate 2
908 thermoelectric semiconductor
910 copper lead
1001 electrode 1
1002 electrode 2
1003 electrode 3
1004 FRP plate
1005 ceramic plate
1006 FRP plate 2
1007 thermoelectric semiconductor
1010 copper lead
1101A refrigerant (ongoing passage section)
1101B refrigerant (return passage section)
1102 former
1103 superconducting strand
1104 electrical insulating layer
1105 bellows pipe
1106 inner pipe
1110 feed-through 1
1112 fixture
1115 outer pipe (stainless steel pipe section)
1116 work hole
1118 flange
1119 outer pipe (iron pipe section)
1120 connection wire
1121 connection metal fixture
1122 flange mounting
1201A refrigerant (ongoing passage section)
1201B refrigerant (return passage section)
1202 former
1203 superconducting strand
1204 electrical insulating layer
1205 bellows pipe
1206 inner pipe 1207A, 1207B flange sections
1208A, 1208B electrical insulating pipe
1210 feed-through 1
1212 fixture
1215 outer pipe (stainless steel pipe section)
1216 work hole
1218 flange
1219 outer pipe (iron pipe section)
1220 connection wire
1222 flange mounting
1223 bellows pipe

What is claimed is:

1. A superconducting power transmission cable at least comprising
    a first pipe having a superconducting member accommodated therein, and
    a second pipe arranged on an outer side of said first pipe; wherein
    a vacuum heat insulating section is provided between said first and second pipes; and
    said second pipe is formed of a ferromagnetic material.

2. The superconducting power transmission cable as defined in claim 1 wherein
    said first pipe has accommodated therein a refrigerant passage section, said superconducting member and an electrically insulating section, in this order, when looking from an inner side.

3. The superconducting power transmission cable as defined in claim 1 wherein
    said second pipe comprises an iron pipe.

4. The superconducting power transmission cable as defined in claim 1 wherein
    said second pipe includes a magnetic gap along the longitudinal direction thereof.

5. The superconducting power transmission cable as defined in claim 4 wherein
    said second pipe is provided with a non-magnetic material within said magnetic gap.

6. The superconducting power transmission cable as defined in claim 1 wherein
    an insulating member composed of a plurality of sheets is provided in said vacuum heat insulating section provided between said first and second pipes, said sheets each having aluminum deposited thereon.

7. The superconducting power transmission cable as defined in claim 1 wherein
    said superconducting member is composed of a former and a superconducting strand wound thereon.

8. The superconducting power transmission cable as defined in claim 1 wherein
    said second pipe performs the role of vacuum heat insulation and retention of magnetic energy.

9. The superconducting power transmission cable as defined in claim 1 wherein
    said second pipe at least includes one pipe accommodated therein via a vacuum heat insulating section; and
    another pipe having said one pipe accommodated therein.

10. The superconducting power transmission cable as defined in claim 9 wherein
    said one pipe is used for keeping vacuum tightness, and said other pipe is used for keeping magnetic energy.

11. The superconducting power transmission cable as defined in claim 9 wherein
    a cushioning member is provided in a gap between said one pipe and said other pipe.

12. The superconducting power transmission cable as defined in claim 1 wherein
    a magnetic shielding member is provided at a site of installation of the superconducting power transmission cable.

13. The superconducting power transmission cable as defined in claim 1 wherein
    facing ends of straight pipe sections of the superconducting power transmission cables are connected to each other by a bellows tube; and
    the straight pipe sections of the superconducting power transmission cable are secured on at least a plurality of sites separated from one another.

14. The superconducting power transmission cable as defined in claim 1 further comprising:
    a first superconducting cable having one end connected to a positive terminal of a first power supply;
    a second superconducting cable having one end connected to a negative terminal of a second power supply;
    a copper cable having one end connected to a connecting point between a negative electrode of said first power supply and a positive terminal of said second power supply;
    a first inverter connected across the other end of said first superconducting cable and the other end of said copper cable; and
    a second inverter connected across the other end of said second superconducting cable and the other end of said copper cable; wherein
    the connecting points between said first and second inverters and the other end of said copper cable are grounded; and
    an a.c. output is delivered from said first and second inverters.

15. The superconducting power transmission cable as defined in claim 13 further comprising:
    a first switch connected in parallel with said first power supply and adapted to be controlled to be on/off;
    a second switch connected in parallel with said second power supply and adapted to be controlled to be on/off;
    a first changeover switch supplied with an output of said first inverter and adapted for connecting said output to an a.c. output or a dummy output in a switching fashion; and
    a second changeover switch supplied with an output of said second inverter and adapted for connecting said output to an a.c. output or a dummy output in a switching fashion.

16. The superconducting power transmission cable as defined in claim 1 wherein
    said first pipe has accommodated therein a first refrigerant passage section, a first superconducting member, a first electrically insulating section, a ferromagnetic section, a second superconducting member through which the current flows in a reverse direction to that in said first superconducting member, a second electrically insulating section and a second refrigerant passage section, in this order, when looking from an inner side.

17. The superconducting power transmission cable as defined in claim 1 wherein
    said ferromagnetic section is composed of a plurality of rings of a ferromagnetic material arranged along a longitudinal axis of said first pipe.

18. The superconducting power transmission cable as defined in claim 16 wherein
    neighboring ones of said rings of the ferromagnetic material are interconnected by a connection wire.

19. The superconducting power transmission cable as defined in claim 1 wherein said first pipe includes a bellows pipe.

20. A superconducting power transmission cable wherein at an ambient temperature end of the superconducting power transmission cable as defined in claim 1,
a superconducting strand, forming said superconducting member, is connected via a lead to a first feed-through performing the role of vacuum sealing and electrical insulation, and is further connected from said first feed-through via a lead to a second feed-through disposed between a vacuum and an atmospheric side; and wherein
a thermoelectric transducer is connected to said second feed-through to reduce heat intrusion;
said thermoelectric transducer being connected from said second feed-through over a cable to an external power supply.

21. The superconducting power transmission cable as defined in claim 20 wherein
said second pipe is formed of a stainless steel pipe on the side of a flange mounting portion mounting said second feed-through, a part of said second pipe surrounding said first pipe is formed by an iron pipe and wherein said stainless steel pipe and the iron pipe are interconnected at a connecting portion.

22. The superconducting power transmission cable as defined in claim 20 wherein
a pipe for influx of a refrigerant flow and a pipe for efflux thereof are provided to said stainless steel pipe at the end of said second pipe forming an ambient temperature end portion and are connected to said first pipe via an electrically insulating pipe.

23. The superconducting power transmission cable as defined in claim 20 wherein
said second feed-through comprises
a first electrode provided on a vacuum side and adapted for carrying said thermoelectric transducer thereon;
an electrically insulating first insulating plate, adapted for carrying said first electrode;
a second electrode sandwiching said first insulating plate with said first electrode and connected over a cable to a power supply on an ambient temperature atmospheric side; and
an electrically insulating second insulating plate, adapted for carrying said second electrode.

24. The superconducting power transmission cable as defined in claim 20 wherein
said second feed-through comprises:
a first electrode provided on the vacuum side and connected to one side of said thermoelectric transducer;
a third electrode provided on the vacuum side and connected to the other side of said thermoelectric transducer and to a current lead;
electrically insulating first and third insulating plates adapted for carrying said first and third electrodes, respectively;
a second electrode sandwiching said first insulating plate with said first electrode and connected over a cable to a power supply on the ambient temperature atmospheric side; and
an electrically insulating second insulating plate, adapted for carrying said second electrode.

25. The superconducting power transmission cable as defined in claim 23 wherein
said second electrode is provided with a fin.

26. The superconducting power transmission cable as defined in claim 23 wherein
said first insulating plate comprises a ceramic plate.

27. The superconducting power transmission cable as defined in claim 23 wherein
said second insulating plate comprises an FRP plate.

28. The superconducting power transmission cable as defined in claim 24 wherein
said third insulating plate comprises an FRP plate.

29. The superconducting power transmission cable as defined in claim 1 wherein
said first pipe has accommodated therein a refrigerant passage section, said superconducting member and an electrically insulating section, in this order, when looking from an inner side;
said refrigerant passage section comprising an ongoing refrigerant passage section and a return passage section disposed on inner and outer sides, respectively; said ongoing refrigerant passage section and said return passage section being separated from each other.

30. The superconducting power transmission cable as defined in claim 29 wherein
a pipe for separating said ongoing refrigerant passage section and said return passage section from each other is provided between said ongoing refrigerant passage section and said return passage section.

31. The superconducting power transmission cable as defined in claim 1 wherein
said first pipe has accommodated therein an ongoing refrigerant passage section, said superconducting member, a return refrigerant passage section and an electrically insulating section, in this order, when looking from the inner side.

32. A superconducting power transmission cable comprising a cooling station for supplying the refrigerant to the superconducting power transmission cable as defined in claim 1, wherein
a connecting portion for connecting one of the superconducting power transmission cables laid for extending from said cooling station to another of the superconducting power transmission cables is mounted at a lower altitude than the site of installation of said cooling station.

33. A superconducting power transmission cable comprising a cooling station for supplying the refrigerant to the superconducting power transmission cable as defined in claim 29, wherein
a connecting portion for connecting one of the superconducting power transmission cables laid for extending from said cooling station to another of the superconducting power transmission cables is mounted at a lower altitude than the site where said cooling station has been installed; and wherein
said cooling station supplies the refrigerant to an ongoing refrigerant passage section of one of the superconducting power transmission cables; said refrigerant having its path reversed at said connecting portion and being returned via a return refrigerant passage section of said one superconducting power transmission cable to said cooling station.

34. A power transmission system comprising the superconducting power transmission cable as defined in claim 1.

* * * * *